United States Patent [19]
Iwamura et al.

[11] Patent Number: 5,285,442
[45] Date of Patent: Feb. 8, 1994

[54] TRAFFIC SUPERVISORY METHOD AND TRAFFIC SUPERVISORY APPARATUS

[75] Inventors: Kazuaki Iwamura; Yasuhiro Katsube, both of Tokyo, Japan

[73] Assignee: Kabushiki Kaisha Toshiba, Kawasaki, Japan

[21] Appl. No.: 759,569

[22] Filed: Sep. 13, 1991

[30] Foreign Application Priority Data

Sep. 29, 1990 [JP] Japan ................... 2-258842

[51] Int. Cl.$^5$ ............................ H04J 1/15; H04J 3/14
[52] U.S. Cl. ................................ 370/17; 370/60
[58] Field of Search ............... 370/13, 17, 60, 60.1, 370/94.1, 94.2, 94.3

[56] References Cited

U.S. PATENT DOCUMENTS

| | | | |
|---|---|---|---|
| 4,779,267 | 10/1988 | Limb | 370/94.1 |
| 4,896,316 | 1/1990 | Lespagnd et al. | 370/94.1 |
| 4,932,020 | 6/1990 | Pashau et al. | 370/60 |
| 5,007,048 | 4/1991 | Kowalk | 370/60 |
| 5,117,417 | 5/1992 | Danner | 370/13 |
| 5,119,367 | 6/1992 | Kawakarsu et al. | 370/94.1 |
| 5,140,588 | 8/1992 | Danner | 370/60 |

FOREIGN PATENT DOCUMENTS 63-42543  2/1988  Japan .

*Primary Examiner*—Douglas W. Olms
*Assistant Examiner*—Chau Nguyen
*Attorney, Agent, or Firm*—Foley & Lardner

[57] ABSTRACT

A traffic supervisory method for supervising a group of packets generated in a terminal according to an assigned traffic characteristic in which the maximum number of packets generated within a regular period time T is set at N comprises respectively counting the number of packets which are generated within regular time periods $\alpha_i \cdot T$ ($\{\alpha_i | 1 \leq i \leq M, 1 \leq \alpha_1 < \alpha_2 < \ldots < \alpha_M\}$) in a packet flow and judging the packets to violate the assigned traffic characteristic in the case where more packets are generated than $\alpha_i \cdot (1+\beta_i) \cdot N(\{\beta_i | 1 \leq i \leq M, \beta_1 \geq \beta_2 > \ldots > \beta_M = 0\})$ within at least one regular interval of time $\alpha_i \cdot T$.

5 Claims, 15 Drawing Sheets

F I G. 10
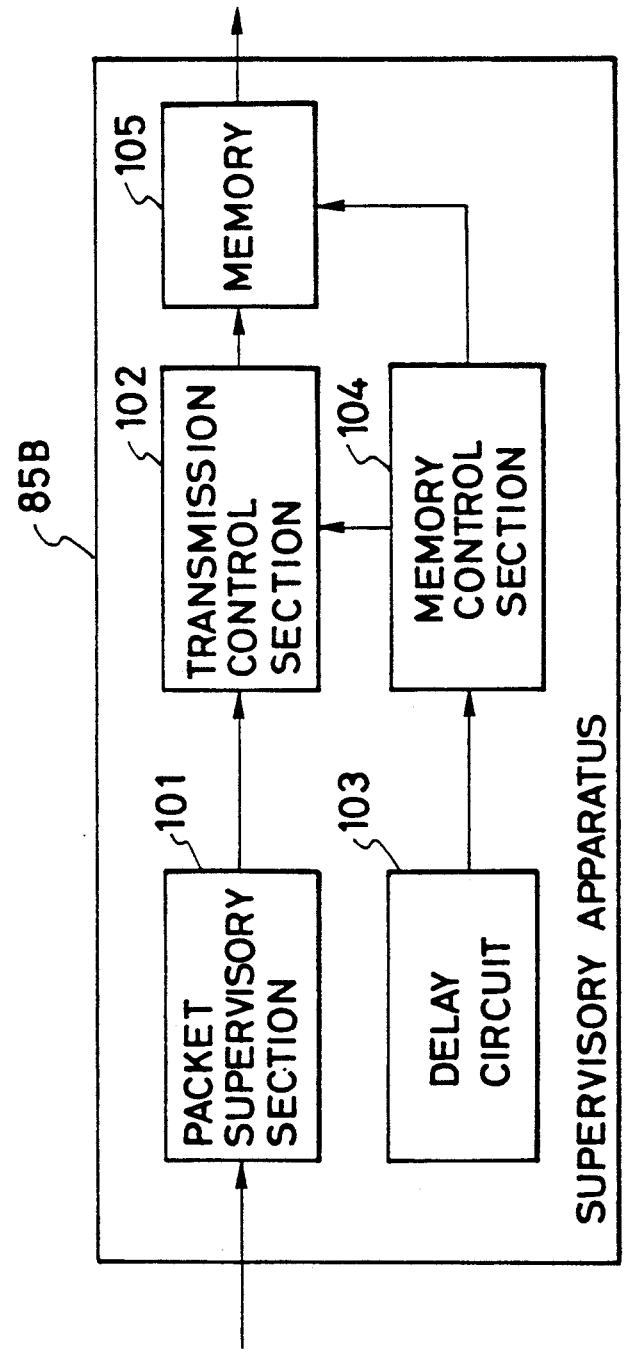

TRAFFIC SUPERVISORY METHOD AND TRAFFIC SUPERVISORY APPARATUS

BACKGROUND OF THE INVENTION

1. Field of the Invention

The present invention relates to a traffic supervisory method for supervising packets to determine whether or not the packets violate a traffic characteristic in a packet switching method or an asynchronous transfer mode (ATM) switching method and a traffic supervisory apparatus for performing the method.

2. Description of Background

Generally, for example, in a packet switched network in which virtual channels are set up among terminals and a regular transmission quality is guaranteed, a call set up control is required to set up the virtual channels. The call set up control is performed for guaranteeing a regular transmission quality of a virtual channel by predicting a certain transmission quality decided by allocating the virtual channel to a terminal when a call set up request occurs and rejecting the call set up request when the predicted transmission quality is inferior to a required transmission quality.

The prediction of the transmission quality is performed according to each traffic characteristic of a virtual channel. For example, the prediction is performed by utilizing one specific value declared as the traffic characteristic by the terminal or utilizing another specific value registered in advance as the traffic characteristic.

A traffic characteristic is defined as a peak rate of generated packets, an average rate, a burst property, and the like. In particular, a method has been proposed to provide the traffic characteristic by utilizing a regular period time T and the maximum number N of packets generated within the regular period time T.

However, even if a call set up is performed by a call set up control, a requested transmission quality is not satisfied in practice when a packet violating the declared traffic characteristic is generated in a call during an actual communication. Therefore, each packet must be supervised to determine whether or not the packet generated at one virtual channel violates the traffic characteristic utilized for the set up control, to reject a violating packet when the violation occurs, and to avoid extending an adverse influence to the transmission quality of the other virtual channels.

Also, the generation of the packets in each terminal must be controlled to generate the packets according to the declared traffic characteristic.

Therefore, a conventional traffic supervisory method has been proposed as follows. In the method, the traffic characteristic is provided by utilizing a regular period time T and the maximum number N of packets generated within the regular period time T as mentioned above. Then, the number of packets generated within the regular period time T is measured and the packets generated beyond N in number are judged to violate the traffic characteristic so that the violating packets are rejected.

However, when the traffic characteristic is supervised by utilizing the above method, a drawback is, for example, produced in the generation of the packets shown in FIG. 1

FIG. 1 shows the highest degree of traffic deviation in the conventional art.

As shown in FIG. 1, in the case where a group of packets (N in number) is intensively generated at a peak rate $N/T_0$ at the latter period $T_0$ of a first regular period time T and another group of packets (N in number) is also intensively generated at a peak rate $N/T_0$ at the first period $T_0$ of a second regular period time T, a group of packets exceeding N in number is detected between a first measuring time t1 and a second measuring time t2 when a starting point t3 of the terminal cycle at which the terminal generates the packets differs from another starting point t1 of the supervising cycle in a packet switched network.

Therefore, even if a group of packets (N in number) is generated in a terminal in one cycle according to a traffic characteristic which is assigned to the terminal, in the packet switched network it is determined whether more packets have been generated than a predetermined value N. That is, the packets are judged to violate the assigned traffic characteristic.

To avoid the above judgement, the coincidence of two types of cycles must be guaranteed. One type of cycle is utilized at the terminals and another type of cycle is utilized in the switched network. However, it is not easy to control both cycles.

Also, whenever a plurality of terminals connected with a multiplexed line through a multiplexing device to efficiently utilize a subscriber's line and many packets which are respectively transmitted through corresponding virtual channels arrive at a multiplexing device to be multiplexed, statistical fluctuation is generated at the time intervals determined by the multiplexed packets.

In detail, as shown in FIG. 2, because a group of packets A is multiplexed with another group of packets B in order of the generation, time intervals T1, T2 between packets are for example changed to time intervals T1′, T2′. Therefore, even if the packets A are generated at a terminal A according to the assigned traffic characteristic, the packets A are shifted in the multiplexing device so that the assigned traffic characteristic is not satisfied at the outlet of the multiplexing device.

Therefore, when the traffic supervision is performed, it is judged that the packets violate the assigned traffic characteristic even if the packets are generated in the terminal according to the assigned traffic characteristic.

Moreover, when a single virtual channel in a subscriber's loop is utilized for communication, the packets generated by an end user are provided to the multiplexing device. Therefore, the peak rate in the virtual channel can be supervised.

However, the end users sometimes communicate with each other by multiplexing a plurality of virtual channels to the single subscriber's loop by utilizing a private branch exchange (PBX) to efficiently utilize the subscriber's loop. In this case, it is impossible to avoid the statistical fluctuation at the arrival intervals of the packets generated by the multiplexing process without utilizing a specific multiplexing method by assigning a regular time slot to each virtual channel.

Therefore, even if the packets are generated in each virtual channel according to a predetermined peak rate, the arrival interval of the packets is sometimes shortened less than the minimum interval decided by the predetermined peak rate in the peak rate supervisory location of the multiplexing device. For the above reason, in the conventional peak rate supervisory method, the packets generated in the terminal according to the assigned traffic characteristic are judged to violate the assigned traffic characteristic.

SUMMARY OF THE INVENTION

First object of the present invention is to provide, with due consideration to the drawbacks of such conventional method and apparatus, a traffic supervisory method in which a group of packets generated in a terminal according to an assigned traffic characteristic is judged not to violate the assigned traffic characteristic.

Second object of the present invention is to provide a traffic supervisory method in which a group of packets generated in a terminal are accurately judged as to whether or not the packets violate an assigned traffic characteristic even if the actual traffic characteristic of the packets statistically fluctuates.

Third object of the present invention is to provide a traffic supervisory method in which a peak rate of a group of packets generated in a terminal is accurately supervised even if the arrival intervals of the packets statistically fluctuate because the packets are multiplexed.

The above objects are achieved in a first aspect by the provision of a traffic supervisory method for supervising a group of packets generated in a terminal according to an assigned traffic characteristic in which the maximum number of packets generated within a regular period time T is set at N, comprising:

respectively counting the number of packets which are generated within regular periods of time $\alpha i \cdot T$ ($\{\alpha i | 1 \leq i \leq M, 1 \leq \alpha 1 < \alpha 2 < \ldots < \alpha_M\}$) in a packet flow, each number of packets being relative to one regular period time $\alpha i \cdot T$; and judging the packets to violate the assigned traffic characteristic in the case where more packets are generated than $\alpha i \cdot (1 + \beta i) \cdot N$ ($\{\beta i | 1 \leq i \leq M, \beta 1 \geq \beta 2 > \ldots > \beta_M = 0\}$) within at least one regular interval of time $\alpha i \cdot T$.

In general, as shown in FIG. 3, less than N packets are generated within the period time T so that the number of packets generated within the regular period time $\alpha i \cdot T$ is $\alpha i \cdot N$ at the most. Therefore, if statistical fluctuation does not occur, the number of arrival packets is $\alpha i \cdot N$ within the regular period time $\alpha i \cdot T$ at the most. On the other hand, if statistical fluctuation occurs, the number of arrival packets can be more than $\alpha i \cdot N$ within the regular period time $\alpha i \cdot T$ regardless of any violation of the assigned traffic characteristic having occurred.

In the above configuration, the arrival packets exceeding $\alpha i \cdot (1 + \beta i) \cdot N$ within the regular period time $\alpha i \cdot T$ are judged to violate the assigned traffic characteristic.

Accordingly, the adverse influence of the statistical fluctuation generated by the multiplexing process is compensated by the factor $(1 + \beta i)$ so that the packets not violating the assigned traffic characteristic when the packets are generated in the terminal are not judged to violate the assigned traffic characteristic even if the statistical fluctuation occurs.

Moreover, because the extent of the above fluctuation is statistically changed, as the measuring period time increases, the difference between the number of packets statistically fluctuating and the number of packets not statistically fluctuating decreases. Therefore, as the regular period time $\alpha i \cdot T$ is larger, the ratio $(1 + \beta i)$ of the number $\alpha i \cdot (1 + \beta i) \cdot N$ of packets allowing the number $\alpha i \cdot N$ of packets not to violate the assigned traffic characteristic approaches 1.

Accordingly, the probability that the packets truly violating the assigned traffic characteristic when the packets are generated will be judged not to violate the assigned traffic characteristic can be small.

The above objects are achieved in a second aspect by the provision of a traffic supervisory method for supervising a group of packets generated in a terminal according to an assigned traffic characteristic in which the maximum number of packets generated within a regular period time T is set at N by storing the arrival packets in a memory of a supervisory apparatus supervising the packet transmission;

counting the number of packets which are stored at the memory within the past period time T by incrementing a counter when one arrival packet stored in the memory is promptly read out from the memory and decrementing the counter when the regular time T elapses after adding one count, the counted packet being sent to the next node;

stopping the counting operation in the counter for a subsequent arrival packet by judging the subsequent arrival packet to violate the assigned traffic characteristic when the value in the counter is equal to or more than N, the subsequent arrival packet being not sent to the next node; and counting again the subsequent packets stored at the memory one by one in the case where the counted value in the counter becomes less than N after a time, the counted packet being sent to the next node.

In the above configuration, when the packet transmission is performed according to the assigned traffic characteristic, the packets arriving at the supervisory apparatus are stored in the memory and promptly read out. In other words, the arrival packets substantially pass through the memory. However, when the arrival packet violates the assigned traffic characteristic, the packet transmission is stopped in the supervisory apparatus so that the arrival packet remains stored at the memory. After a time, the packet is judged not to be in violation so that the arrival packet stored at the memory is read out and transmitted to the next node.

Accordingly, all the generated packets can be transmitted according to a declared parameter without rejection of the packets.

The above objects are achieved in a third aspect by the provision of a traffic supervisory method for supervising a group of packets generated in a terminal according to an assigned traffic characteristic in which the maximum number of packets generated within a regular period time T is set at N by storing the arrival packets in a memory of a supervisory apparatus supervising the packet transmission and reading out the arrival packets from the memory when the regular period time T has passed after storing the packets, the packets arriving within the past period time T being always stored in the memory; and judging a subsequent arrival packet to violate the traffic characteristic when the number of stored packets is equal to or more than N.

In the above configuration, the memory stores the packets which have arrived at the supervisory apparatus within the past regular period time T.

Accordingly, by supervising the number of packets stored in the memory, it is possible to promptly detect whether or not the subsequent packet arriving at the supervisory apparatus violates the assigned traffic characteristic.

The above objects are achieved in a fourth aspect by the provision of a traffic supervisory method for supervising a group of packets generated in a terminal according to an assigned traffic characteristic in which the maximum number of packets generated within a regular period time T is set at N by counting the number of packets which arrive at a supervisory apparatus supervising the packet transmission within the past regular time T by incrementing a counter when a packet arrives at the supervisory apparatus and decrementing the counter when the regular period time T has elapsed after the packet has arrived; and, judging a subsequent arrival packet to violate the assigned traffic characteristic in the case where the value in the counter is equal to or more than N.

In the above configuration, the number of packets arriving at the apparatus within the past regular time T is always counted.

Accordingly, by supervising the number of arrival packets, it is possible to promptly detect whether or not the subsequent packet arriving at the supervisory apparatus violates the assigned traffic characteristic.

The above objects are achieved in a fifth aspect by the provision of a traffic supervisory method for supervising a group of packets generated in a terminal according to an assigned traffic characteristic in which a peak rate in packet transmission is set by calculating a difference value between an interval at which the packets actually arrive at a supervisory apparatus and an expected interval at which the packets should arrive according to the prescribed peak rate;

accumulating the calculated difference values respectively obtained for each arrival packet; and judging whether or not the arrival packets violate the assigned traffic characteristic by comparing the accumulated value with a prescribed threshold value.

In the above configuration, for example, the intervals at which the packets actually arrived at the apparatus are subtracted one by one from the intervals at which the packets should arrive according to the peak rate. When the resultant calculated value is negative, this means that the arrival of the packets is delayed compared with the peak rate. On the other hand, when the resultant calculated value is positive, this means that the arrival interval of the packets is shorter than at the peak rate.

Accordingly, by adding the calculated value obtained for each arrival packet, even if statistical fluctuation is generated by the multiplexing operation, when the arrival packets are supervised for a long period, the fluctuation is compensated so that the packets are not judged in error.

Moreover, when a group of packets actually violating the assigned traffic characteristic arrive at the apparatus, the accumulated value increases so that the arrival packets can be judged to violate the traffic characteristic when the accumulated value exceeds the prescribed threshold value.

Accordingly, by the first to fifth aspects according to the present invention, when the arrival intervals of the packets statistically fluctuate as a result of the multiplexing operation and the like, the supervisory for finding that the packets actually generated more than the peak rate can be performed.

The above objects are achieved by the provision of a traffic supervisory apparatus for supervising a group of packets generated in a terminal according to an assigned traffic characteristic in which the maximum number of packets generated within a regular period time T is set at N, comprises:

a plurality of packet counters for respective counting the number of packets which are generated within regular time periods $\alpha_i \cdot T$ ($\{\alpha_i | 1 \leq i \leq M, 1 \leq \alpha_1 < \alpha_2 < \ldots < \alpha_M\}$) in a packet flow, each counter counting the number of packets relative to one regular time period $\alpha_i \cdot T$;

a judgement section for judging the packets to violate the assigned traffic characteristic in the case where more packets are generated than $\alpha_i \cdot (1+\beta_i) \cdot N$ ($\{\beta_i | 1 \leq i \leq M, \beta_1 \leq \beta_2 > \ldots > \beta_M = 0\}$) at least in one of the packet counters, the packets being not sent the next node; and a transmission control section for controlling subsequent arrival packets based on the judgement at the judgement section.

In the above configuration, the first aspect can be easily performed.

The above objects are achieved by the provision of a traffic supervisory apparatus for supervising a group of packets generated in a terminal according to an assigned traffic characteristic in which the maximum number of packets generated within a regular period time T is set at N, comprises:

a memory section for temporarily storing the arrival packets;

a counter for counting the number of packets arriving within the past period time T by incrementing in the case where a packet arrives and decrementing in the case where the period time T has elapsed after the packet has arrived; and an output control section for promptly outputting the packets stored in the memory section in the case where the value counted in the counter is equal to or less than N and not outputting the packets stored in the memory section in the case where more than N value is counted in the counter.

In the above configuration, the second aspect can be easily performed.

The above objects are achieved by the provision of a traffic supervisory apparatus for supervising a group of packets generated in a terminal according to an assigned traffic characteristic in which the maximum number of packets generated within a regular period time T is set at N, comprises:

a packet supervisory section for supervising the arrival of the packets;

a memory section for temporarily storing the packets arriving through the packet supervisory section;

a delay section for outputting a packet arrival signal when the time T has elapsed since the signal was provided from the packet supervisory section;

a memory control section for supervising the number of packets stored in the memory section, providing a first control signal to the memory section in the case where the number of packets stored in the memory section is less than N when the packet arrival signal is received from the delay section, and outputting a second control signal in the case where N packets or more than N packets are stored in the memory section when the packet arrival signal is received from the delay section; and a transference control section for controlling the packets stored in the memory section when the second control signal is received from the memory control section.

In the above configuration, the third aspect can be easily performed.

The above objects are achieved by the provision of a traffic supervisory apparatus for supervising a group of packets generated in a terminal according to an assigned traffic characteristic in which a peak rate in packet transmission is prescribed, comprises:

a packet supervisory section for supervising the arrival of the packets;

a counter for counting the number of arrival packets within the past regular period time T by incrementing the counter when a packet arrives and decrementing the counter when the regular period time T has elapsed since the packet arrived; and a transference control section for judging subsequent arrival packets to violate the assigned traffic characteristic when N packets or more than N packets is counted in the counter and controlling the judged packets.

In the above configuration, the fourth aspect can be easily performed.

The above objects are achieved by the provision of a traffic supervisory apparatus for supervising a group of packets generated in a terminal according to an assigned traffic characteristic in which a peak rate in packet transmission is set, comprises:

a packet supervisory section for supervising the arrival of the packets;

a counter for counting the difference value between an interval at which the packets actually arrive at the packet supervisory section and an expected interval at which the packets should arrive according to the prescribed peak rate;

an adder for accumulating the counted difference values respectively obtained for each arrival packet in the counter;

a judgement section for judging whether or not the arrival packets violate the assigned traffic characteristic by comparing the value accumulated in the adder with a prescribed threshold value; and a transference control section for controlling the arrival packets in the case where the packets are judged to violate the assigned traffic characteristic in the judgement section.

In the above configuration, the fifth aspect can be easily performed.

BRIEF DESCRIPTION OF THE DRAWINGS

FIG. 10 is a configuration block diagram of a supervisory apparatus, shown in FIG. 8, arranged at the packet switched network side, showing a first modification according to the third aspect.

DETAILED DESCRIPTION OF THE PREFERRED EMBODIMENTS

Preferred embodiments of a traffic supervisory method and apparatus according to the present invention are described by utilizing packet switched networks as an example with reference to FIG. 4 to FIG. 17.

Figure 4:
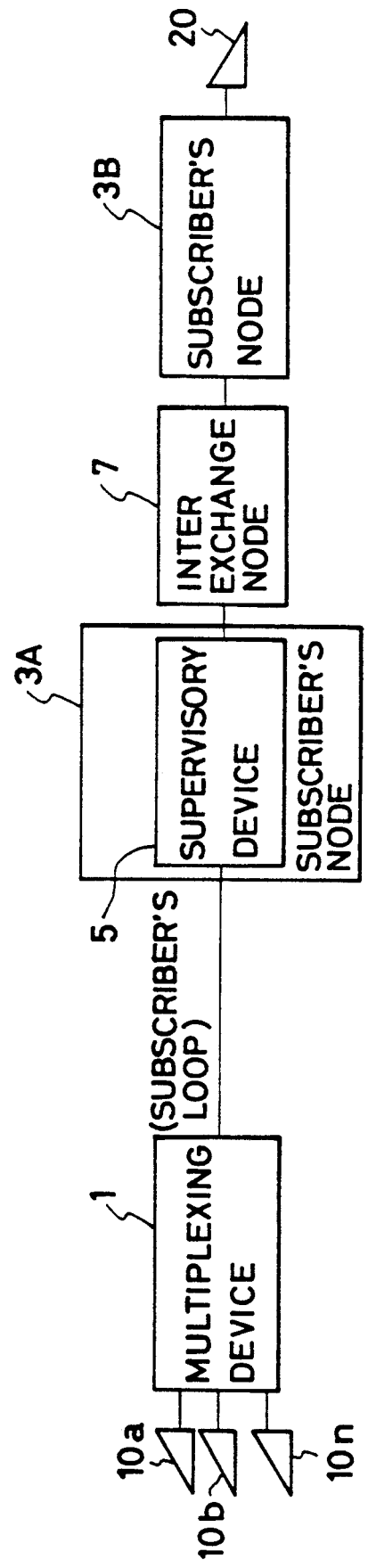
FIG. 4 is a configuration block diagram of a packet switched network according to a first embodiment of the present invention, showing the first aspect.

FIG. 4 is a configuration block diagram of a packet switched network according to a first embodiment of the present invention.

As shown in FIG. 4, a virtual channel VC is set up between terminals $10a, 10b, \ldots, 10n$ respectively generating packets and a receiving terminal 20 receiving the packets so that communication is performed. The number of packets generated within a regular period time T at a terminal $10a$ in the virtual channel is set at a maximum of N.

The packets generated at the terminal $10a$ are multiplexed with the other packets generated at the other terminals $10b, \ldots, 10n$ in a multiplexing device 1 so that the packets are provided to a subscriber's node 3A through a subscriber's loop. In the subscriber's node 3A, the supervision to determine whether or not the packets are generated according to an assigned traffic characteristic is performed by a supervisory apparatus 5. Thereafter, the packets are transmitted to an interchange node 7 from the subscriber's node 3A. The packets are then transmitted to a subscriber's node 3B which is arranged at a slave station side so that the packets are finally transmitted to the receiving terminal 20.

In the supervisory apparatus 5, the specific packets generated at the terminal 10a are distinguished from a group of packets multiplexed in the subscriber's loop to provide supervision to determine whether or not more than N in number of the specific packets are generated within the regular period time T while considering the statistical fluctuation. In detail, even if the specific packets are generated according to an assigned traffic characteristic at the terminal 10a, when a supervisory period $\alpha T$ is short, the possibility of exceeding the allowable number $\alpha N$ of packets in which the statistical fluctuation is not considered is statistically large. However, as the supervisory period $\alpha \cdot T$ is large, the possibility of exceeding the allowable number $\alpha \cdot N$ of packets is decreased.

Therefore, M types of the number of packets arriving at the supervisory apparatus 5 within the regular period time $\alpha i \cdot T$ ($i = 1, 2, \ldots, M$) are measured so that a judgement is made that the packets are generated at the supervised terminal 10a according to the assigned traffic characteristic while considering the coefficient $(1+\beta i)$ when the measured number of packets is equal to or less than $\alpha i \cdot (1+\beta i) \cdot N$.

Figure 1:
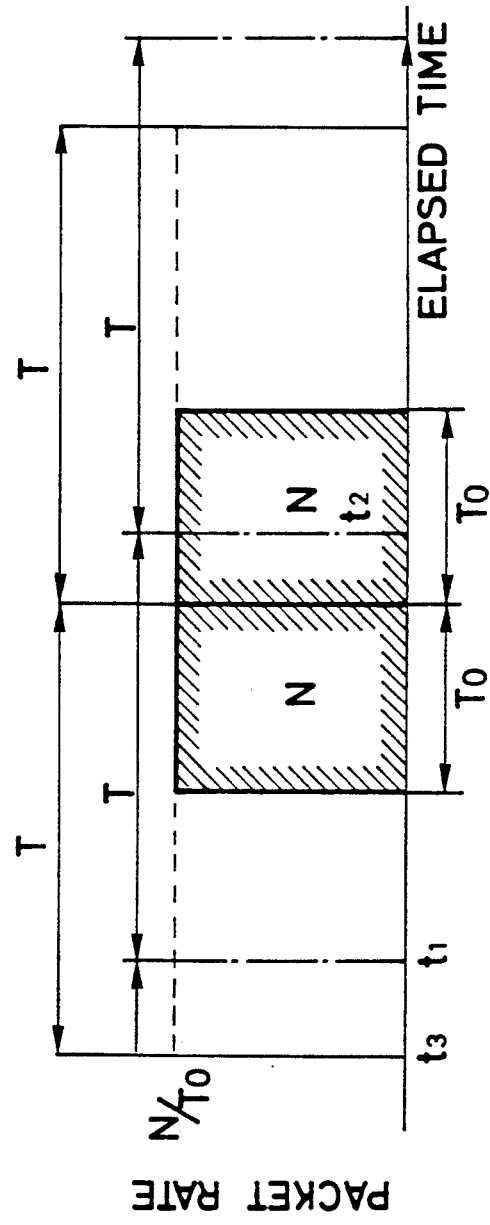
FIG. 1 shows the highest degree of traffic deviation in the conventional art.
Figure 2:
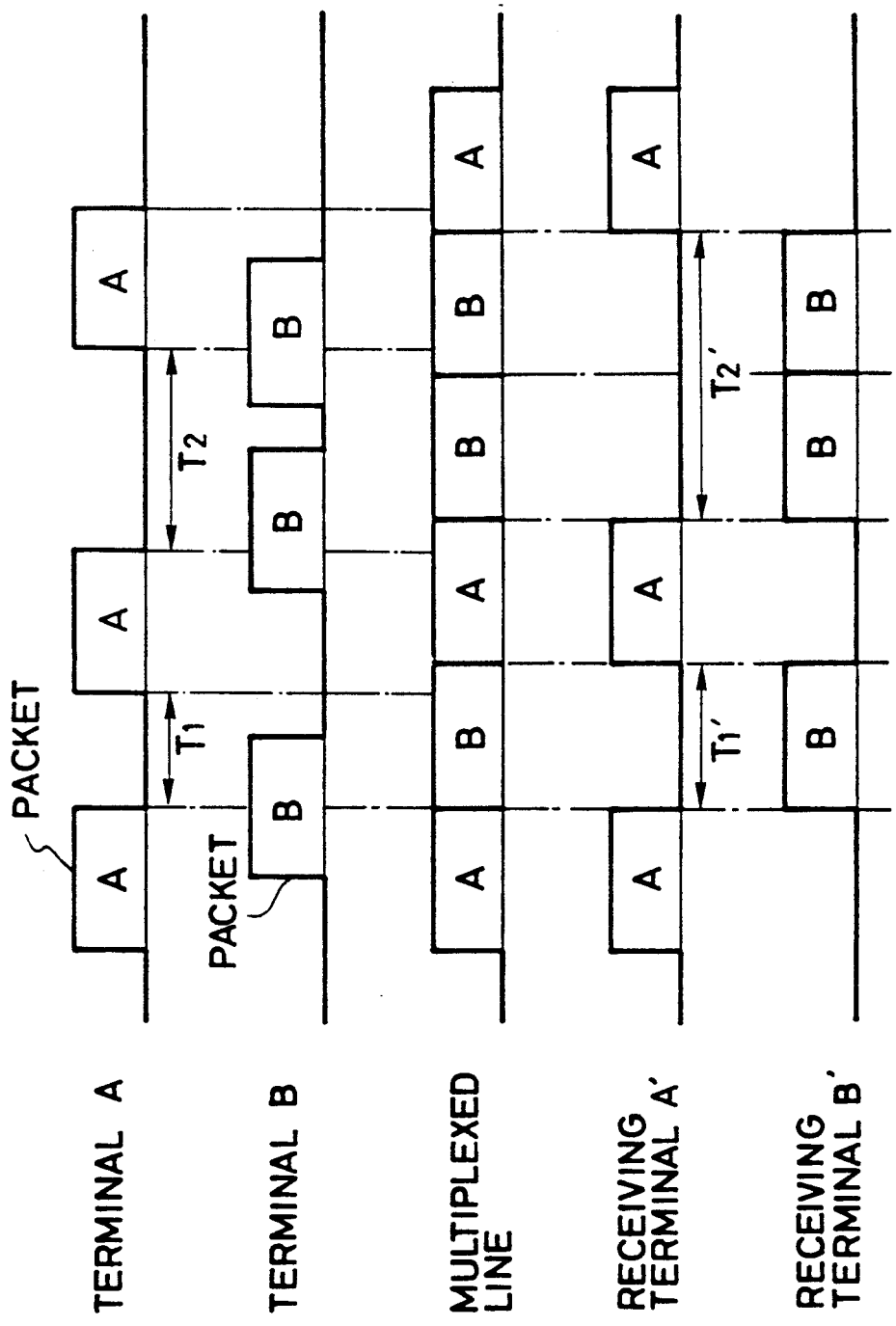
FIG. 2 is an explanatory view showing the fluctuations in the intervals at which packets are transmitted through a multiplexed channel.
Figure 3:
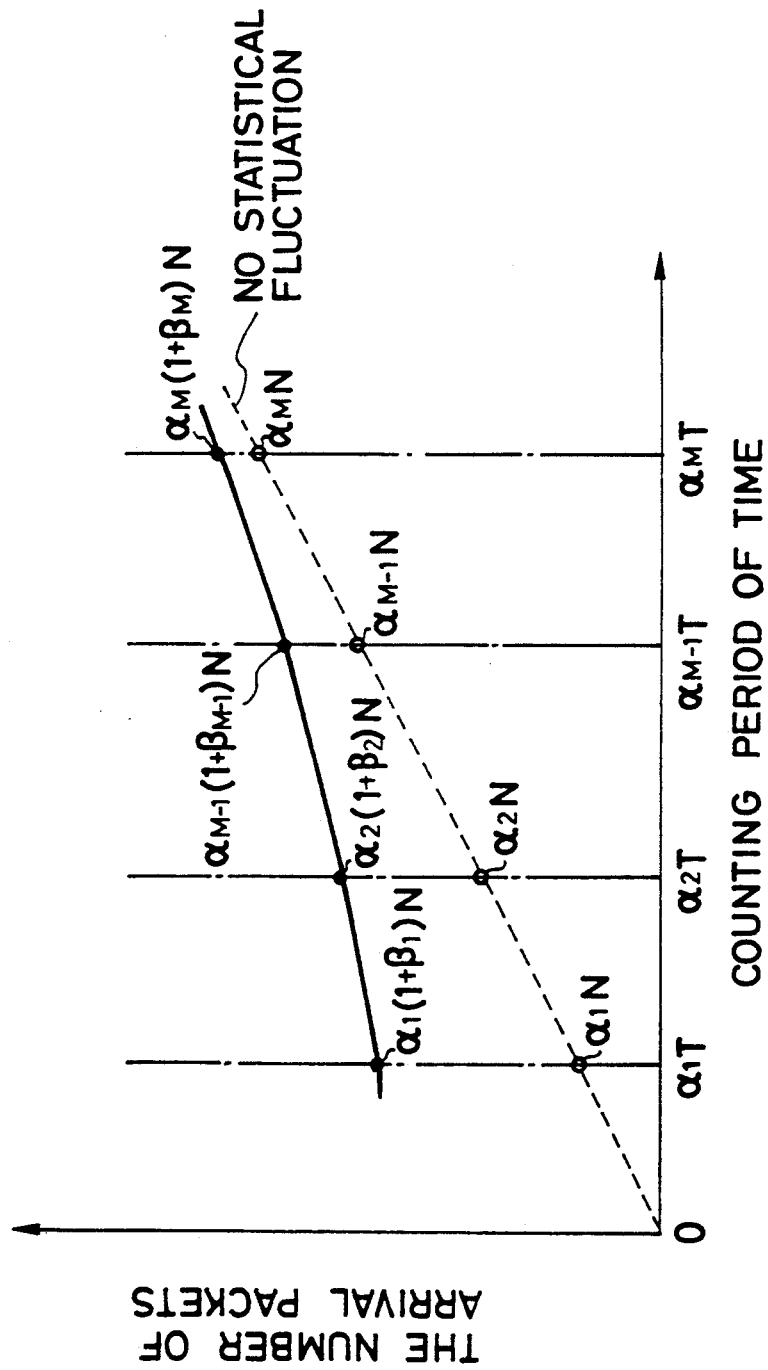
FIG. 3 is a graph for showing the relation between statistical fluctuations and measurement intervals in case where the number of arrival packets is measured.

As shown in FIG. 3, $\alpha i$ is defined as M types of values $\{\alpha i | 1 \leq i \leq M, 1 \leq \alpha 1 < \alpha 2 < \ldots < \alpha_M\}$ and $\beta i$ is also defined as M types of values $\{\beta i | 1 \leq i \leq M, \beta 1 \geq \beta 2 < \ldots < \beta_M = 0\}$). That is, as the measuring time $\alpha i \cdot T$ increases, the reference value $\alpha i \cdot (1+\alpha i) \cdot N$ for judging whether or not the arrival packets violate the assigned traffic characteristic decreases because the value $1+\beta i$, by which the statistical fluctuation is considered, decreases.

Accordingly, as the measuring time $\alpha i \cdot T$ increases, a curved line indicating the change of the reference value $\alpha i \cdot (1+\beta i) \cdot N$ approaches a straight line and thus indicating the allowable number $\alpha i \cdot N$ of packets for which the statistical fluctuation is not considered.

Figure 6:
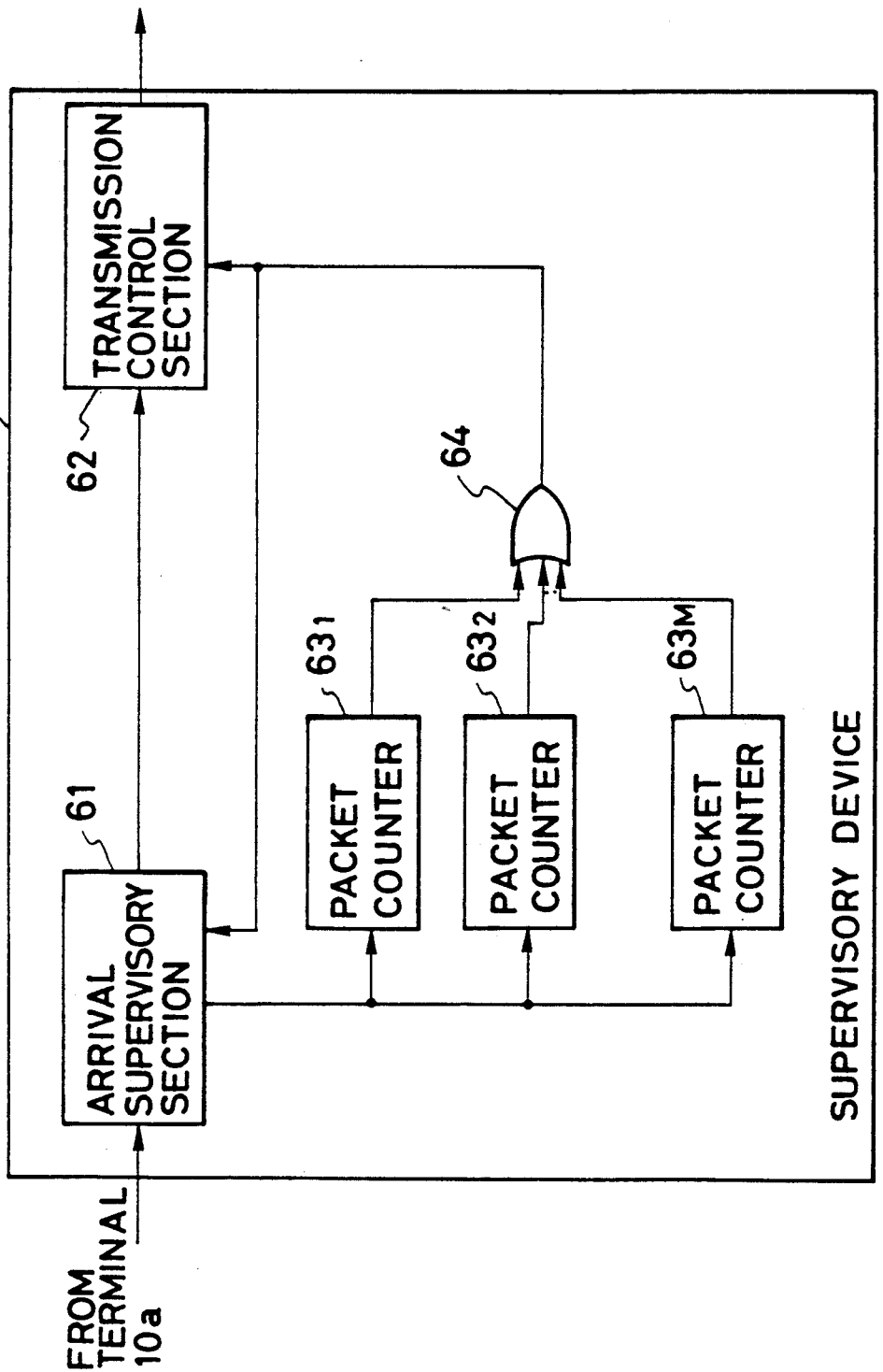
FIG. 6 is a configuration block diagram of a supervisory apparatus shown in FIG. 4 according to the first aspect.

FIG. 6 is a configuration block diagram of a supervisory apparatus 5 shown in FIG. 4 according to the first aspect.

As shown in FIG. 6, the arrival of packets generated, for example, at the terminal 10a is supervised at an arrival supervisory section 61, then the arrival packets are transmitted to a transmission control section 62. Simultaneously, arrival signals indicating the arrival of the packets are respectively provided to packet counters 63i ($i = 1$ to M) from the arrival supervisory section 61. In each packet counter 63i, the number of packets arriving at the supervisory section 61 within the regular period time $\alpha i \cdot T$ is measured. At this time, when the measured number of packets is equal to or more than $\alpha i \cdot (1+\beta i) \cdot N$ in a specific packet counter 63i, the latest arrival packet is judged to have violated the assigned traffic characteristic so that a violation signal is provided to an OR circuit 64 from the specific packet counter 63i in which the latest arrival packet is judged to be in violation.

Figure 5:
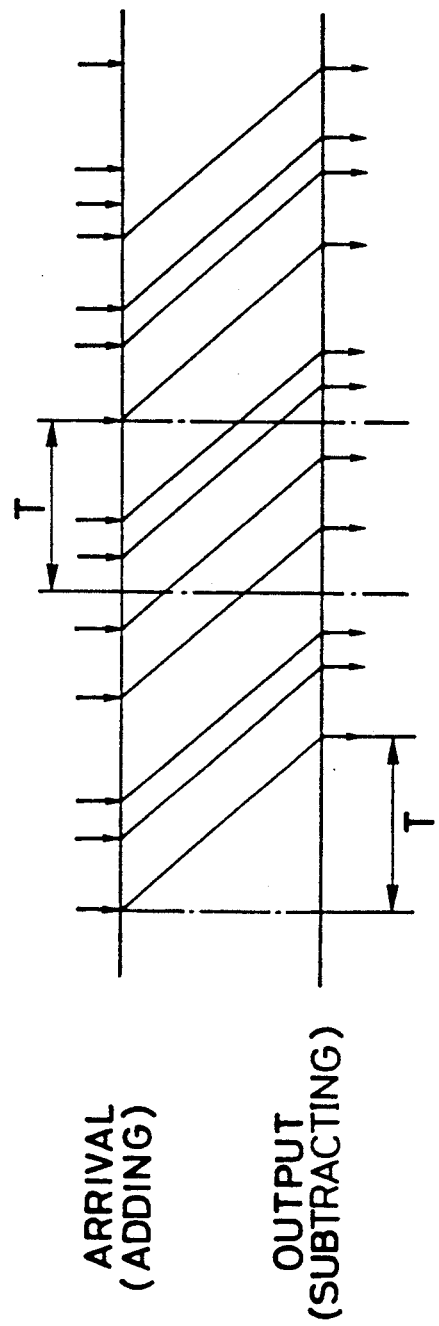
FIG. 5 is an explanatory view showing the operation in a counter by which the number of packets arriving within the past period of time T is counted, the section being arranged in a supervisory apparatus of the packet switched network according to the first to fourth aspects of the present invention.
Figure 7:
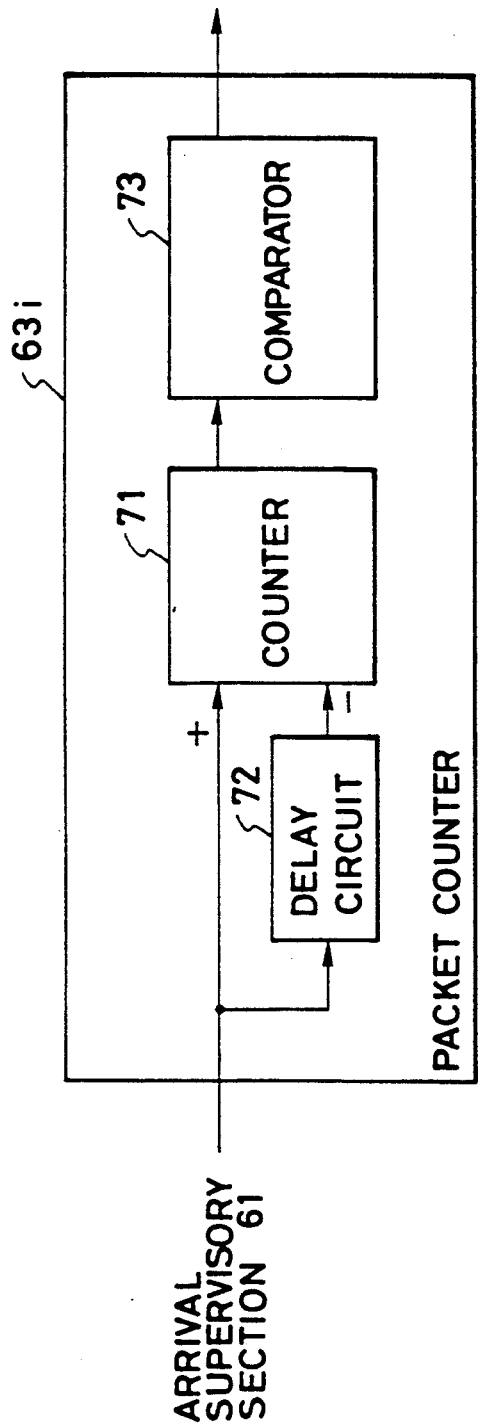
FIG. 7 is a configuration block diagram of a packet counter shown in FIG. 6.

In detail, as shown in FIG. 7 which is a configuration block diagram of the packet counter shown in FIG. 6, the arrival signal from the arrival supervisory section 61 is provided to a counter 71 and a delay circuit 72. In the delay circuit 72, a delayed input signal is provided to the counter 71 when the regular period time $\alpha i \cdot T$ has elapsed after receiving the arrival signal. In the counter 71, the counted value increases by one when the arrival signal from the arrival supervisory section 61 is directly provided, and the counted value decreases by one when the delayed input signal is provided. In other words, as shown in FIG. 5, the number of packets arriving at the arrival supervisory section 61 within the past period time $\alpha i \cdot T$ is counted in the counter 71.

Thereafter, the counted value is provided to a comparator 73 from the counter 71. When the counted value is equal to or more than $\alpha i \cdot (1+\beta i) \cdot N$, the violation signal which means that the latest arrival packet has violated the assigned traffic characteristic is provided to the OR circuit 64.

Now referring FIG. 6, when a violation signal is provided to the OR circuit 64 from at least one of the packet counters 63i, a control signal which indicates that the latest arrival packet violates the assigned traffic characteristic is provided to the arrival supervisory section 61 and the transmission control section 62.

In the arrival supervisory section 61, when the control signal is provided, the arrival signal is not provided to the packet counters 63i even if subsequent packets arrive at the arrival supervisory section 61. In other words, because the number of packets arriving at the arrival supervisory section 61 within the past period time $\alpha i \cdot T$ decreases after a time, the provision of the violation signal to the OR circuit 64 is stopped.

In the transmission control section 62, the packet which is transmitted from the arrival supervisory section 61 is output without change when the control signal is not provided from the OR circuit 64. On the other hand, when the control signal is provided from the OR circuit 64, the transmitted packet from the arrival supervisory section 61 receives "transmission control".

That is, when the packets violating the traffic characteristic assigned in "call set up control" are generated at the terminal 10, the transmission quality of not only the terminal 10 but also the other terminals deteriorates. Therefore, some type of transmission control for the violating packet is required. The transmission control for the violating packet at the transmission control section 62 is described as follows.

In a first transmission control, when a packet is judged to violate the assigned traffic characteristic, the packet is rejected at the transmission control section 62 so that the traffic in the switched network is in accord with the traffic characteristic assigned by the call set up control.

In a second transmission control, a packet judged to violate the traffic characteristic is tagged indicating that the packet with the tag violates the assigned traffic characteristic. Then, the tagged packet is transmitted to a next node. Thereafter, for example, when some packet must be rejected because the packets are intensively transmitted to the interexchange node 7, the tagged packets are selectively rejected while the other untagged packets are not rejected. Therefore, the transmission quality of the untagged packets does not deteriorate.

The tag is for example indicated at a specific field in a packet header. The rejection of the packets is required when a buffer overflow occurs. Also, the rejection of the packets is required when the transmission delay increases because the number of packets waiting to be transmitted to the next node increases without generating a buffer overflow. The methods of the first and second transmission control are also performed for the other embodiments as mentioned hereinafter.

In the above first embodiment, the number M of regular time periods $\alpha i \cdot T$ and the values $\alpha i, \beta i$ should be determined to ensure that two types of possibilities respectively agree with the regular values. One possibility is that the packets generated at the terminal 10 according to the assigned traffic characteristic are erroneously judged to violate the characteristic because of the multiplexed operation at the multiplexing device 1. Another possibility is that the packets generated at the terminal 10 which violate the assigned traffic characteristic are erroneously judged not to violate the characteristic.

Therefore, the values M, $\alpha i$, and $\beta i$ depend on one traffic characteristic for the supervised traffic and another traffic characteristic for the multiplexed traffic. The values M, $\alpha i$, and $\beta i$ can be determined by specifying a predetermined value or giving a certain value to each virtual channel when the channel is newly set up. Moreover, the values M, $\alpha i$, and $\beta i$ can be determined by giving the same value to all virtual channels or giving a specific value for one virtual channel differing from the other specific values for the other virtual channels.

Moreover, when the period time T is set at the minimum allowable period time and the number of packets N is set at 1, the peak rate of the packets can be supervised in the same manner.

Furthermore, the traffic can be supervised not only in the virtual channel but also in a theoretical connection such as a virtual path, for example, between interexchange nodes or between a subscriber's node and an interexchange node.

Next, a second embodiment is described as follows.

Figure 8:
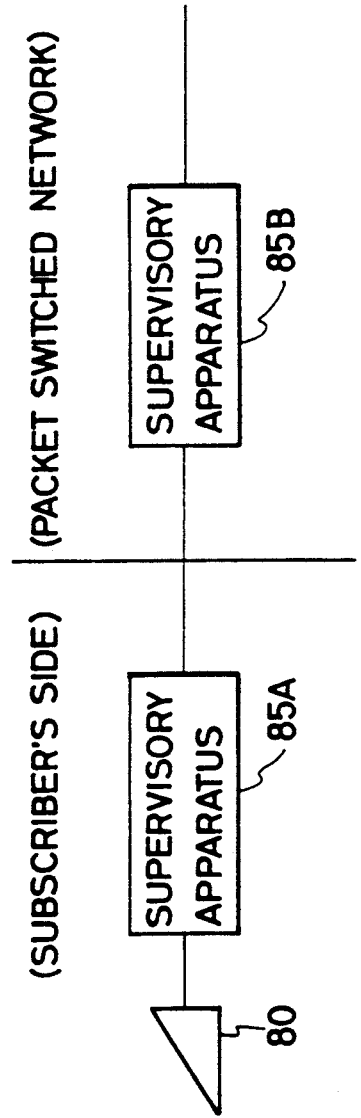
FIG. 8 is a configuration block diagram of a packet switched network according to a second embodiment of the present invention.

FIG. 8 is a configuration block diagram of a packet switched network according to a second embodiment of the present invention.

As shown in FIG. 8, packets generated in a terminal 80 are transmitted to communicate with the other terminal (not shown) through a packet switched network.

Parameters indicating a characteristic of the packet flow are declared in advance to the packet switched network by the terminal 80. A virtual channel according to the parameters is set up to connect the terminal 80 with the packet switched network. On a subscriber's side, a supervisory apparatus 85A is arranged to provide the packets to the virtual channel according to the declared parameters. In the packet switched network, a supervisory apparatus 85B is arranged to judge whether or not the packet flow in the virtual channel satisfies the declared parameters.

The parameters are a regular period time T and the allowable number N of packets which may be transmitted within the regular period time T.

Figure 9:
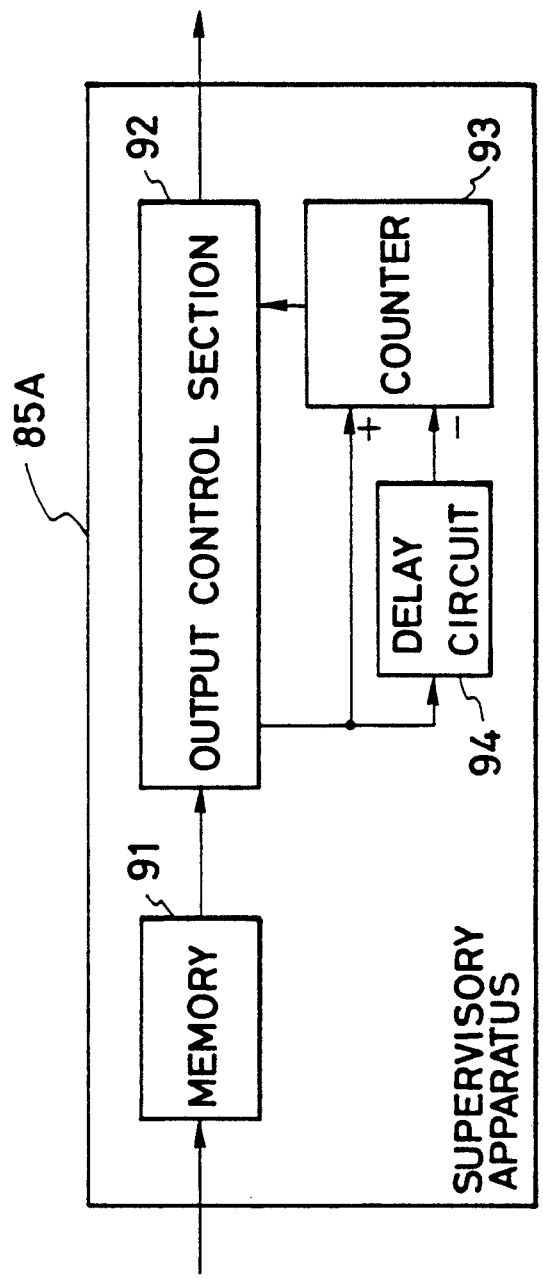
FIG. 9 is a configuration block diagram of a supervisory apparatus, shown in FIG. 8, arranged at the subscriber side according to the second aspect.

A first configuration block diagram of the supervisory apparatus 85A shown in FIG. 8 is shown in FIG. 9.

As shown in FIG. 9, the packets arriving at the supervisory apparatus 85A are at once stored in a memory 91. Thereafter, when the number of packets read out and transmitted from the memory 91 within the past regular period time T is equal to or less than N, the packets stored in the memory 91 are promptly transmitted to the supervisory apparatus 85B through an output control section 92. Moreover, for each transmission of the arrival packets from the memory 91 to the output control section 92, a packet read-out signal is provided from the output control section 92 to a counter 93 and a delay circuit 94.

In the delay circuit 94, the received packet read-out signal is delayed for the regular period time T and transmitted to the counter 93.

In the counter 93, when the packet read-out signal is directly provided from the output control section 92, an internal count value increases by one. On the other hand, when the packet read-out signal is indirectly provided through the delay circuit section 94, an internal count value decreases by one. That is, the number of packets outputting from the supervisory apparatus 85A within the past regular period time T is counted at the counter 93 as shown in FIG. 5 in the same manner as the counter 71 shown in FIG. 7.

Therefore, the number of packets transmitted to the output control 92 within the past regular period time T is counted at the counter 93.

When the number of packets read out from the memory 91 within the past regular period time T is equal to or more than N, the counted value in the counter 93 exceeds N−1 so that an output control signal informing the output control section 92 of violating packet arrival is provided from the counter 93. In the output control section 92, when the output control signal is provided, the provision of the packet read-out signal to the counter 93 and the delay circuit 94 is stopped while stopping the read-out of the packets from the memory 91 and stopping the provision of the packets to the supervisory apparatus 85B. In other words, the operation fetching the packet arriving at the supervisory apparatus 85A is stopped in the output control section 92 and subsequent arrival packets are stored in the memory 91. The provision of the packets in the output control section 92 is kept stopping until the packet read-out signal is provided from the delay circuit 94 to the counter 93 to inform the counter 93 that the packet has arrived before the regular period time T so that the counted value in the counter 93 is changed to less than N.

When the counted value in the counter 93 is changed to less than N and the provision of the output control signal from the counter 93 to the counter 92 is stopped, the packets stored in the memory 91 are read out in turn and transmitted to the supervisory apparatus 85B.

Accordingly, by utilizing the supervisory apparatus 85A, rejection of packets can be avoided, or the packets can be provided to the supervisory apparatus 85B according to the declared parameter without tagging the packet.

It is preferable that a signal be provided to the terminal 80 to halt the generation packet without utilizing a buffer such as the memory 91 when the counted value at the counter 93 is equal to or more than N.

Moreover, it is preferable that the delay circuit 94 comprise a delay device in which the time for physically transmitting packets is adjusted to the regular period time T. Also, it is preferable that the delay circuit 94 comprise a memory in which the arrival time or the arrival interval of packets is stored and the stored data is output when the time T has elapsed.

The above configuration is also available for delay circuits as mentioned hereinafter.

Next, a first configuration block diagram of the supervisory apparatus 85B shown in FIG. 8 is shown in FIG. 10.

As shown in FIG. 10, when a packet arrives at a packet supervisory section 101 of the supervisory apparatus 85B, the arrival packet is transmitted to a transmission control section 102. Simultaneously, a packet arrival signal is provided to a delay circuit 103.

Thereafter, the packet arrival signal is delayed for the time T so that the signal is provided to a memory control section 104. When the delayed signal is provided from the delay circuit 103 to the memory control section 104, a first control signal is provided from the memory control section 104 to a memory 105 so that the packet stored at the memory 105 the time T before is output.

In the memory 105, at least N packets can be stored. And, the number of packets actually stored in the memory 105 is supervised at the memory control section 104. That is, as shown in FIG. 5, the packets arriving within the past period time T are always stored in the memory 105. Therefore, when the number of packets stored in the memory 105 is equal to or more than N, subsequent arrival packets are judged to violate the assigned traffic characteristic.

In detail, when the number of packets stored in the memory 105 is equal to or more than N, a transmission control signal is provided from the memory control section 104 to the transmission control section 102 to inform of the arrival of the violating packet. In the transmission control section 102, when the transmission control signal is provided from the memory control section 104, the arrival packet is judged to violate the traffic characteristic so that the transmission control such as the rejection or the tagging to indicate a violating packet is performed.

When the rejection operation is adopted as the transmission control at the transmission control section 102, the violating packet is not output from the memory 105. On the other hand, when the violating packet is tagged as the transmission control, the tagged violating packet is output from the memory 105 so that the packet is selectively rejected at a suitable interexchange node when the rejection of the packet is required.

When the memory 105 is full of the packets and the subsequent packet arrives at the supervisory apparatus 85B, the tagged violating packet in the memory 105 is rejected so that the subsequent packet is stored.

Accordingly, it is always possible to judge as to whether or not the number of packets arriving within the past period time T is more than N.

Figure 11:
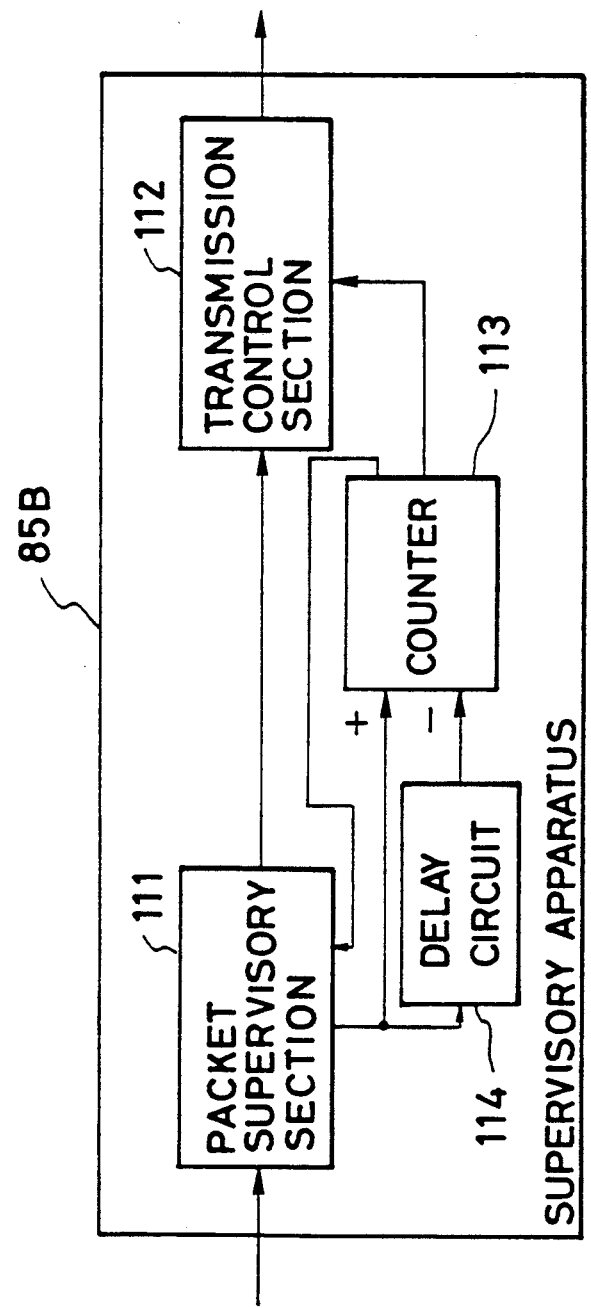
FIG. 11 is a configuration block diagram of a supervisory apparatus, shown in FIG. 8, arranged at the packet switched network side, showing a second modification according to the fourth aspect.

Next, a second configuration block diagram of the supervisory apparatus 85B shown in FIG. 8 is shown in FIG. 11.

As shown in FIG. 11, when a packet arrives at a packet supervisory section 111, the packet is transmitted from the packet supervisory section 111 to a transmission control section 112. Simultaneously, a packet arrival signal is provided to a counter 113 and a delay circuit 114.

The packet arrival signal provided to the delay circuit 114 is delayed for the time T so that the delayed signal is provided to the counter 113.

In the counter 113, when the packet arrival signal is directly provided, the counted value increases by one. On the other hand, when the packet arrival signal is indirectly provided through the delay circuit 114, the counted value decreases by one. That is, the number of packets arriving within the past period time T is counted as shown in FIG. 5 in the same manner as the counter 71 shown in FIG. 7.

When the counted value is equal to or more than N in the counter 113, a transmission control signal is provided to the transmission control section 112. Simultaneously, the transmission control signal is provided to the packet supervisory section 111.

In the packet supervisory section 111, when the transmission control signal is provided from the counter 113, the direct transmission of a subsequent packet arrival signal to the counter 113 is stopped until the delayed packet arrival signal is provided to the counter 113 through the delay circuit 114 so that the counted value is subtracted.

In other words, when more than N arrival packets are counted in the counter 113, information that subsequent arrival packets violate the traffic characteristic is transmitted to the packet supervisory section 111 and the transmission control section 112 from the counter 113 until the counted value in the counter 113 is changed to less than N after a time.

In the transmission control section 112, when the transmission control signal is provided from the counter 113, subsequent arrival packets are judged to violate the traffic characteristic so that the transmission control is performed. That is, the subsequent arrival packets are rejected or tagged to indicate that these packets violate the traffic characteristic.

Accordingly, it is possible to determine whether or not the number of packets arriving within the arbitrary period time T is less than N or not.

Moreover, in the case where the parameters regulating the virtual channel are a combination of a plurality of periods of time T and a plurality of packet numbers N, in other words when the supervision is performed in a plurality of time intervals, it is preferable that the delay circuits 114 and the counters 113 be arranged in parallel to equal the number of combinations of T and N and the transmission control signals provided from the counters 113 be provided to an OR circuit. In this case, when one of the combinations of T and N detects a violation, the violating packet can be detected and rejected.

The above mentioned method can be available to the supervision of the peak rate. In this case, T is equivalent to the minimum arrival interval and the number of packets N is equal to 1.

Moreover, the above mentioned embodiments are applicable to not only the traffic supervision of the virtual channel but also the traffic supervision at the virtual path terminator. In this case, a plurality of virtual channels is multiplexed to a virtual path and the parameters regulating the virtual path are the regular period time T and the maximum number of packets transmitted through the virtual path within the regular period time T.

Figure 12:
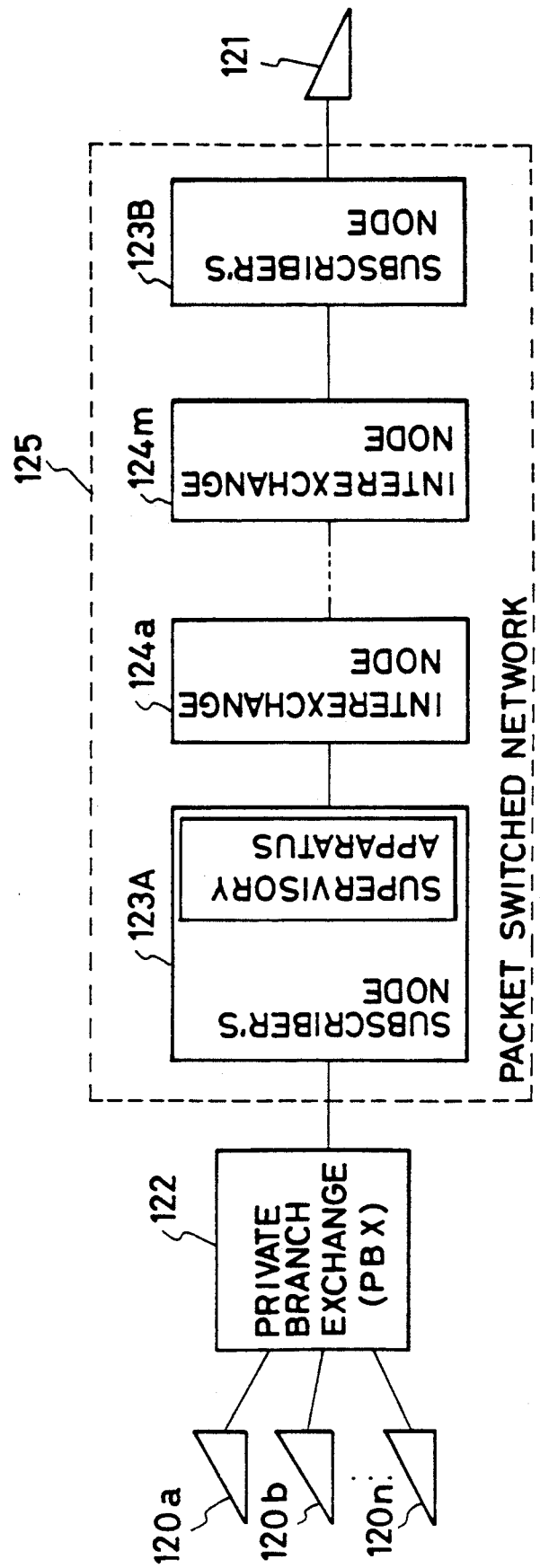
FIG. 12 is a configuration block diagram of a packet switched network according to a third embodiment of the present invention.

Next, FIG. 12 is a configuration block diagram of a packet switched network according to a third embodiment of the present invention.

As shown in FIG. 12, packets generated at terminal $120a$ , . . . , or $120n$ are transmitted to a terminal 121 through a packet switched network 125 to communicate between the terminals 120 and the terminal 121.

Physically, the packet generated, for example, at the terminal $120a$ is transmitted to a PBX 122 through a signal line so that the packet is multiplexed with the other packets generated at the other terminals $120b$ to $120n$. Thereafter, the multiplexed packet is transmitted to a subscriber's node 123A in the packet switched network 125 through a subscriber's loop. Then the packet is transmitted to the terminal 121 through interexchange nodes $124a$ to $124m$ and a subscriber's node 123B.

Theoretically, a virtual channel is set up between two terminals. When the virtual channel is assigned, a peak rate for the packets generated at each terminal is declared. The declared peak rate or a value registered in advance is recognized in the packet switched network 125 so that the transmission quality achieved in the assigned virtual channel is estimated. When the estimated transmission quality is superior to a required transmission quality, a call set up control is performed to assign the virtual channel.

Accordingly, in real communication, if the communication is not performed according to the peak rate utilized in the call set up control, the transmission quality deteriorates so that the transmission quality in the other virtual channel also deteriorates. Therefore, the peak rate of the virtual channel must be supervised at a specific position where the subscriber's loop is connected with the packet switched network 125 and the transmission control is performed so that the transmission control does not deteriorate when a group of packets exceeding the peak rate arrives.

Figure 13:
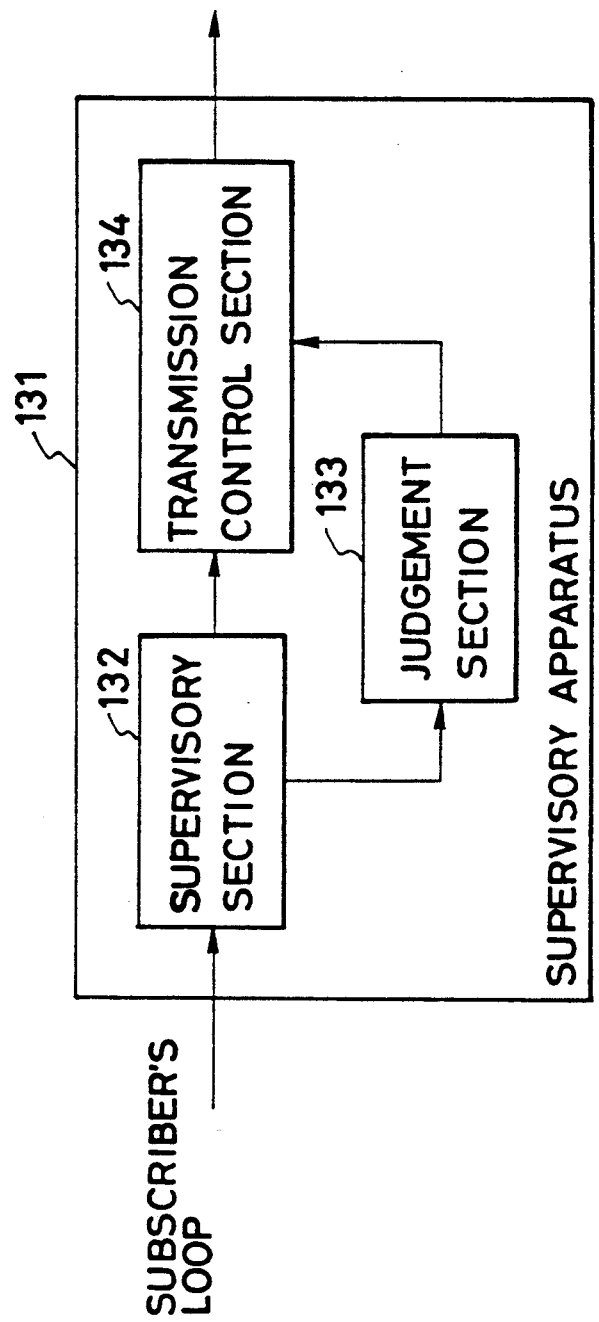
FIG. 13 is a configuration block diagram of a supervisory apparatus supervising a peak rate in a subscriber node shown in FIG. 12.

Next, FIG. 13 is a configuration block diagram of a supervisory apparatus 131 supervising a peak rate in the subscriber's node 123 shown in FIG. 12.

As shown in FIG. 13, a packet transmitted from the subscriber's loop is supervised at a supervisory section 132. The arrival of the packet is informed to a judgement section 133. In the judgement section 133, a judgement is made as to whether or not the arrival packet violates the peak rate based on the supervisory result at the supervisory section 132. The judgement result obtained at the judgement section 133 is informed to a transmission control section 134.

Figure 14:
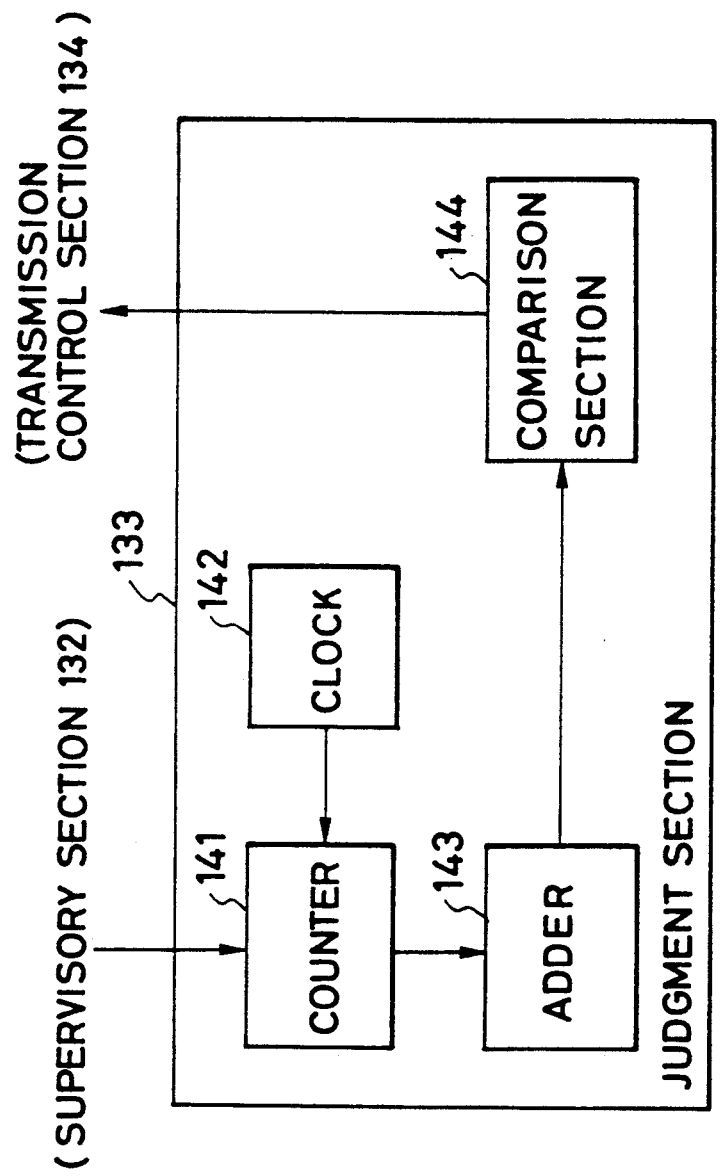
FIG. 14 is a configuration block diagram of a judgement section shown in FIG. 13 according to the fifth aspect of the present invention.

In detail, as shown in FIG. 14 which is a configuration block diagram of the judgement section 133 shown in FIG. 13, in a counter 141, a minimum arrival interval $T_0$ according to the peak rate defined for the virtual channel in advance is set as an initial value after the arrival of the packet. The initial value is decreased according to a clock signal provided from a clock 142 until a subsequent packet arrives at the supervisory apparatus 131 so that the arrival of the subsequent packet is informed to the counter 141. When the arrival of the subsequent packet is informed the counter 141 from the supervisory section 132, a counted value $t_c$ at the counter 141 is transmitted to a adder 143. The minimum arrival interval $T_0$ is reset in the counter 141.

The absolute value of the counted value $t_c$ is equal to the difference between the arrival interval of the packets actually arriving at the supervisory section 132 and the minimum arrival interval $T_0$ according to the peak rate. When the counted value $t_c$ is negative, the negative value indicates that the arrival of the subsequent packets is late compared with the minimum arrival interval $T_0$. On the other hand, when the counted value $t_c$ is positive, the positive value indicates that the arrival of the subsequent packets is earlier than the minimum arrival interval $T_0$.

In the adder 143, the counted values $t_c$ at the counter 141 are accumulated to calculate an accumulative value Av. Thereafter, the accumulative value Av is compared with a threshold value Tv, which is predetermined, in a comparison section 144. When the accumulative value Av exceeds the threshold value Tv, the latest arrival packet is judged to have violated the peak rate.

That is, because the accumulative value Av is obtained by accumulating the difference between the arrival interval of the packets and the minimum arrival interval $T_0$, when the accumulative value Av deviates to a large positive value, it is judged that the packets actually arriving at the supervisory section 132 exceed the peak rate as a whole. On the other hand, when the packets arrive at the supervisory section 132 temporarily exceeding the peak rate by the statistical fluctuation based on the multiplex operation, the arrival intervals of the subsequent packets are naturally extended. Therefore, the accumulative value Av does not deviate to a large positive value so that the statistical fluctuation temporarily generated based on the multiplex operation is allowed.

Now referring the FIG. 13, when the judgement at the judgement section 133 is informed to the transmission control section 134, the arrival packet is output, rejected, or tagged according to the judgement result at the transmission control section 134.

In the tagging operation, for example, a specific bit in a header is set to 1 to indicate that a tagged packet violates the peak rate. When the packets are intensively transmitted at an interexchange node so that some packets must be rejected, the violating packets are detected by the indication of the header so that the tagged packets are selectively rejected.

Accordingly, when the arrival packets are judged to have violated the peak rate, the transmission control such as the rejection of the packets or tagging the violating packet is performed at the transmission control section 134. Therefore, the transmission quality in the other virtual channels does not deteriorate in the packet switched network 125.

Moreover, because the violating packets are rejected when rejection is required in the tagging operation, the packets can be transmitted when the packet transmission is required so that the transmission efficiency in the packet switched network can be improved and the possibility of rejecting a packet erroneously judged to have violated the peak rate decreases.

It is preferable that the positive counted values $t_c$ only be accumulated in the adder 143.

In this case, the supervisory operation is performed more safely because the packets arriving earlier than the minimum arrival interval are counted. Moreover, it is preferable that the latest prescribed number of counted values $t_c$ be accumulated in the adder 143.

In this case, the influence of the older packets is eliminated.

Furthermore, it is preferable that the decrementing operation at the counter 141 be maintained as if the packet did not arrive at the supervisory section 132 when it is judged that the arriving packets violate the peak rate.

In this case, there is no problem of the violating packets being regarded as not arriving because the violating packets are originally rejected or tagged to be selectively rejected.

Furthermore, it is preferable that the threshold value Tv be determined relative to the peak rate of the virtual channel. Also, the packets are sometimes generated in a burst. In this case, the counted value $t_c$ at the counter 141 or the accumulated value Av at the adder 143 sometimes reaches a value less than a negative prescribed value. Therefore, it is preferable that the counted value $t_c$ or the accumulated value Av be reset to 0 and the value be subtracted or added once more when the subsequent packets arrive.

Figure 15:
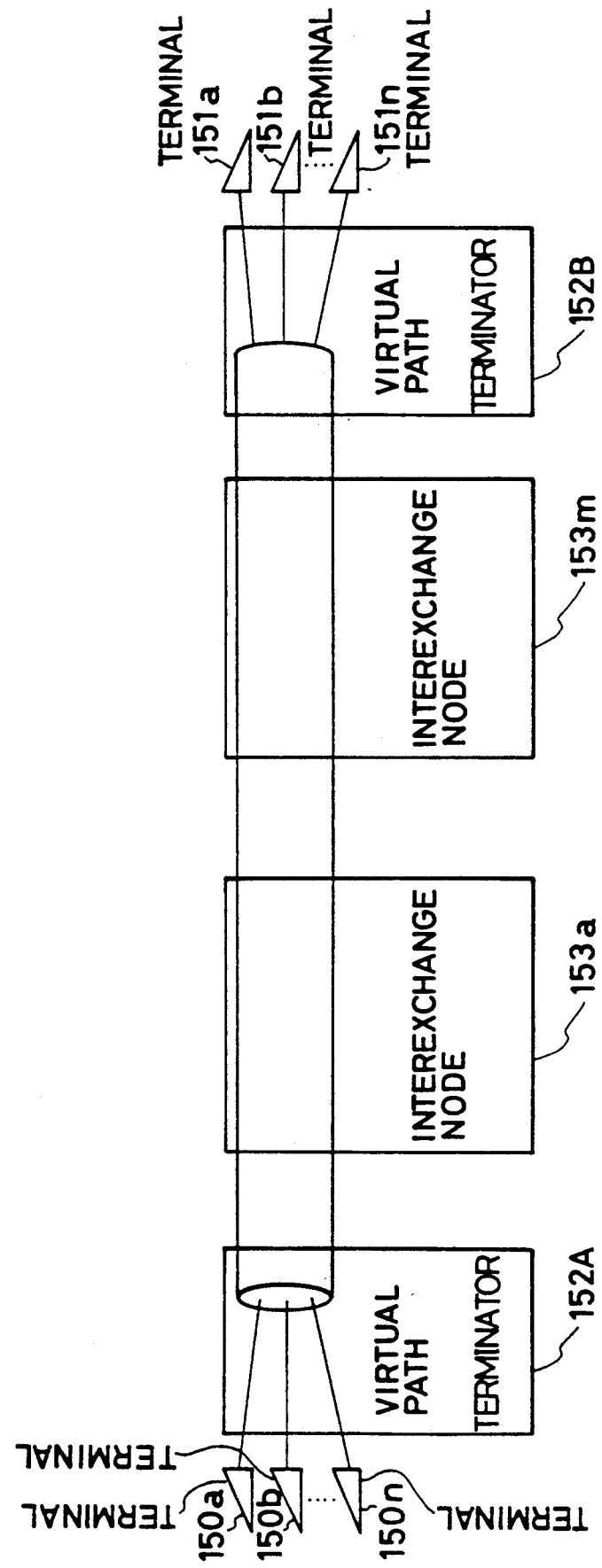
FIG. 15 is a configuration block diagram of a packet switched network according to a fourth embodiment of the present invention.

Next, a configuration block diagram of a packet switched network according to a fourth embodiment of the present invention is shown in FIG. 15. And, a packet header utilized in the packet switched network shown in FIG. 15 is shown in FIG. 16.

Figure 16:
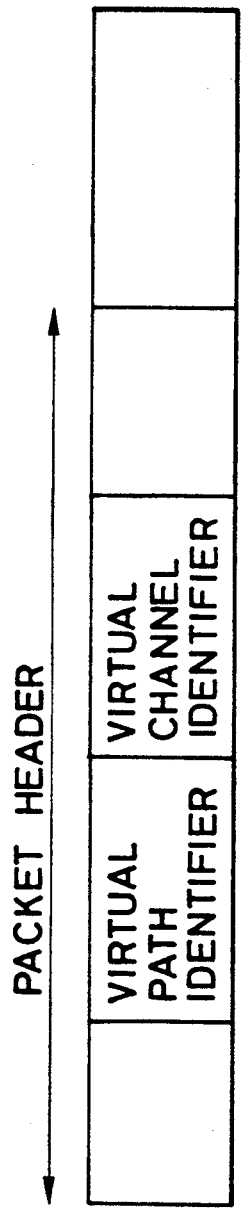
FIG. 16 shows a packet header utilized in the packet switched network shown in FIG. 15.

As shown in FIG. 16, a packet header comprises a virtual channel identifier VCI for identifying each virtual channel and a virtual path identifier VPI for identifying each virtual path.

As shown in FIG. 15, virtual channels which are set up between terminals 150a to 150n and terminals 151a to 151n are multiplexed to virtual paths at a virtual path terminator 152A. The interexchange process for the virtual paths is performed at interexchange nodes 153a to 153m in a virtual path unit regardless of each virtual channel. The multiplexed virtual channels are demultiplexed at a virtual path terminator 152B so that each virtual channel is connected with one terminal 151.

Therefore, the configuration of the interexchange nodes 153a to 153m is simplified because the virtual paths are not terminated at the interexchange nodes 153a to 153m.

Moreover, because it is enough to perform the call set up control such as the assignment of the virtual channels at the virtual path terminators 152A, 152B, the switched network including the virtual path terminators 152A, 152B and the interexchange nodes 153a to 153m is provided at low cost.

In the above configuration utilizing the virtual paths, to guarantee a prescribed transmission quality for each virtual channel, the virtual path multiplexed with the virtual channels is guaranteed a prescribed transmission quality. Therefore, the assignment of the virtual path is performed by utilizing the transmission quality guaranteed when the virtual channels are multiplexed to the virtual path and the transmission quality of the virtual path. To satisfy the prescribed transmission quality at the virtual path, the traffic characteristic of the virtual path must be determined so that the transmission of the packets is performed while satisfying the traffic characteristic.

One of the parameters regulating the traffic characteristic of the virtual path is the peak rate of the virtual path. When the peak rate of the virtual path is definitely guarateed, transmission control such as the assignment of a specific time slot to the virtual path is the physical link is required. In this control, it is necessary to store the packet at once. Therefore, the transmission of the packets is delayed and the flexibility in communication management deteriorates.

To settle the above problem, the supervision of the peak rate is performed at the virtual path terminators 152A, 152B in the same manner as in the third embodiment.

Figure 17:
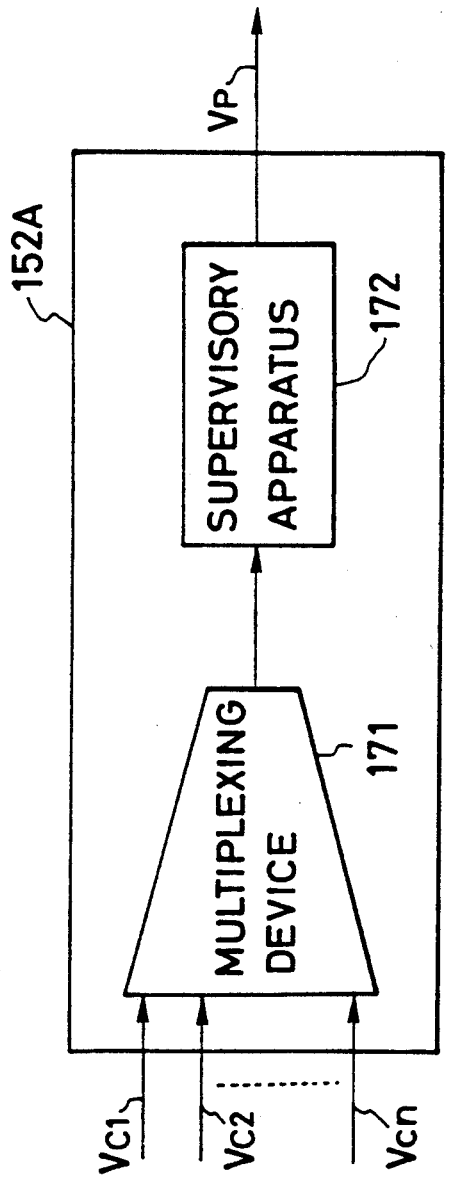
FIG. 17 is a configuration block diagram of a virtual path terminator shown in FIG. 15 according to the sixth aspect of the present invention.

A configuration block diagram of the virtual path terminator 152A shown in FIG. 15 is shown in FIG. 17.

As shown in FIG. 17, the packets being transmitted through the virtual channel are multiplexed at a multiplexing device 171 of the virtual path terminator 152A. Then, the arrival of the packets is supervised at a supervisory apparatus 172.

The supervisory apparatus 172 has the same configuration as the supervisory apparatus 131 shown in FIG. 13.

In the supervisory apparatus 172, when a packet violating the peak rate regulating the virtual path arrives at the device 172, transmission control such as the rejection or indication of the violating packet is performed.

It is preferable that the supervision of the peak rate regulating the virtual path be performed after multiplexing the packet transmitted from the virtual path terminators 152A in the physical link.

In the above embodiments, the present invention is described by utilizing a packet switched network as an example. However, the present invention is applicable to an ATM switched network in the same manner as the packet switched network.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A traffic supervisory method for supervising a group of packets generated in a terminal according to an assigned traffic characteristic in which a maximum number of packets which is generated within a regular period of time T is set at N, where N is a positive number, comprising the steps of:

defining a first set of parameters $\alpha_1, \alpha_2, \ldots \alpha_M$, for a number M, where $M > 2$, where respective parameters of said first set are greater than one and arranged in an ascending order, and a second set of parameters $\beta_1, \beta_2, \ldots \beta_M$, said second set of parameters being arranged in a descending order so that a last one of the second set of parameters, $\beta_M$, equals zero;

respectively counting the number of packets which are generated within regular periods of time expressed by $\alpha_i \cdot T$, where $i = 1, 2, \ldots, M$;

respectively calculating $\alpha_i \cdot (1 + \beta_i) \cdot N$ where $i = 1, 2, \ldots, M$;

evaluating whether the packets counted in the above counting step violate the assigned traffic characteristic whenever the packets generated within the regular period of time T exceed $\alpha_i \cdot (1 + \beta_i) \cdot N$ within at least one regular period of time $\alpha_i \cdot T$;

transmitting the packets evaluated in the evaluating step as violating the traffic characteristic with an identification tag; and prioritizing rejection of the tagged packets.

2. A method according to claim 1, wherein the counting step includes:

counting the number of packets which arrived within a period of time $\alpha_i \cdot T$ by incrementing when a packet arrives and decrementing when said period of time $\alpha_i \cdot T$ has elapsed after the arrival of the packet; and comparing the counted value with the number $\alpha_i \cdot (1 + \beta_i) \cdot N$ for an i-th time period and providing a signal indicating a comparison result thereof.

3. A traffic supervisory apparatus for supervising a group of packets generated in a terminal according to an assigned traffic characteristic in which a maximum number of packets which is generated within a regular period time T is set at N, where N is a positive number, and having a first set of parameters $\alpha_1, \alpha_2, \ldots \alpha_M$, for a number M, where $M > 2$, where respective said parameters of said first set are greater than one and arranged in an ascending order, and a second set of parameters, $\beta_1, \beta_2, \ldots \beta_M$, which are arranged in a descending order so that a last one of the second set of parameters equals to zero, comprising:

a plurality of packet counters for respectively counting the number of packets which are generated within regular periods of time expressed by $\alpha_i \cdot T$, where $i = 1, 2, \ldots, M$;

a judgement section, receiving input from said packet counters, for calculating $\alpha_i \cdot (1+\beta_i) \cdot N$, where $i=1, 2, \ldots, M$ and for performing an evaluation of whether the packets counted in the packet counters violate the assigned traffic characteristic whenever the generated packets exceed $\alpha_i \cdot (1+\beta_i) \cdot N$ within at least one regular interval of time $\alpha_i \cdot T$; and a transmission control section for controlling subsequent arrival packets based on the evaluation at the judgement section.

4. An apparatus according to claim 3 in which each packet counter includes:

a counter for counting the number of packets which arrived within a period of time $\alpha_i \cdot T$ by incrementing in the case where a packet arrives and decrementing in the case where said period of time $\alpha_i \cdot T$ has elapsed after the packet has arrived; and a comparison section for comparing the value counted at the counter with the value $\alpha_i \cdot (1+\beta_i) \cdot N$ for an i-th time period and providing a signal indicating a comparison result thereof.

5. An apparatus according to claim 3 in which the transmission control section transmits packets determined in the judgement section as violating the traffic characteristic, with an identification tag to prioritize rejection of the tagged packets.

* * * * *